United States Patent [19]

Sauve

[11] Patent Number: 5,613,327
[45] Date of Patent: Mar. 25, 1997

[54] DOOR SILL GARNISH TRIM

[75] Inventor: Paul J. Sauve, Warren, Mich.

[73] Assignee: Chrysler Corporation, Auburn Hills, Mich.

[21] Appl. No.: 393,637

[22] Filed: Feb. 24, 1995

[51] Int. Cl.$^6$ ........................................................ E06B 7/16
[52] U.S. Cl. ............................. 49/490.1; 49/467; 49/506; 296/146.9; 296/209
[58] Field of Search ........................... 49/490.1, 498.1, 49/506, 479.1, 467; 52/716.3, 716.4, 716.8, 717.01, 222; 296/209, 97.23, 39.1, 146.9

[56] References Cited

U.S. PATENT DOCUMENTS

| | | | |
|---|---|---|---|
| 2,114,344 | 4/1938 | Haberstump | 49/467 X |
| 3,622,195 | 11/1971 | Lautenbach | 296/209 X |
| 3,742,649 | 7/1973 | Dochnahl | 49/441 |
| 4,007,536 | 2/1977 | Soderberg | 29/421 |
| 4,092,813 | 6/1978 | Eggert | 52/397 |
| 4,457,111 | 7/1984 | Koike | 49/441 |
| 4,461,507 | 7/1984 | Minami et al. | 296/76 |
| 4,830,898 | 5/1989 | Smith | 428/122 |
| 4,843,763 | 7/1989 | Mesnel | 49/440 |
| 4,902,549 | 2/1990 | Bright et al. | 418/122 |
| 4,926,600 | 5/1990 | Mesnel | 49/491 |
| 4,951,418 | 8/1990 | Keys | 49/440 |
| 5,123,693 | 6/1992 | Karashima et al. | 49/490.1 X |
| 5,143,772 | 9/1992 | Iwasa | 49/490.1 X |
| 5,288,121 | 2/1994 | Graves | 49/490.1 X |

*Primary Examiner*—Philip C. Kannan
*Attorney, Agent, or Firm*—Margaret A. Dobrowitsky

[57] ABSTRACT

A door sill garnish trim piece for concealing and protecting a vehicle door or hatch opening flange is described that has a cross-section featuring a seating member opposite a pair of curved projects. As the door sill garnish trim piece is snapped onto the flange, the curved projection deflect around and provide clearance for a line of rivet heads on the flange allowing it to seat snugly within the door sill garnish trim. A closed cell structure attached to the seating member provides support for the occupant as he or she enters or exits the vehicle. A narrow U-shaped channel looping behind the seating member establishes a rigid surface for a vehicle door seal. A piece of carpeting is affixed to the outside and tucked into the U-shaped channel. Prior to installation, the door sill garnish trim piece is trimmed to a predetermined length. At installation, the door sill garnish trim piece is visually located then manually pressed onto the riveted door sill flange, eliminating the need for fasteners and hand or power tools.

18 Claims, 1 Drawing Sheet

5,613,327

DOOR SILL GARNISH TRIM

FIELD OF INVENTION

The present invention relates to a door sill garnish trim piece that: 1) conceals and protects a vehicle door or hatch opening flange of riveted construction; and 2) provides a hard sealing surface to receive the vehicle door seal. More particularly, the present invention relates to a novel carpeted door sill garnish trim piece with an extruded base member that features: 1) a pair of curved projections, which deflect around and snap over a line of rivet heads; 2) a closed cell section, which provides support for the load of the occupant's body during entry and exit of the vehicle; and 3) a narrow "U" channel section, which maintains tension against the door or hatch opening flange and rivets, accepts a carpet covering, and establishes a rigid sealing surface for a vehicle door seal.

BACKGROUND OF THE INVENTION

In response to demands for fuel efficiency, the auto industry is exploring the application of new materials that reduce weight in passenger and commercial autobody construction. One of the many challenges presented by the use of aluminum alloys to achieve lightweight autobody construction is how to conceal and protect riveted body panel flanges. Rather than being welded together as is typical with steel body panels, aluminum alloy body panels are often riveted together.

A particular challenge presented in lightweight aluminum autobody construction is developing a trim piece to conceal and protect a riveted door or hatch sill flange, while simultaneously providing a sealing surface for the vehicle door bulb seal. A trim piece that meets this challenge must deflect around and snap over a line of rivet heads having the ability to compensate for minor variations in the placement of these rivet heads. Such a door sill garnish trim piece must also be sufficiently strong and stiff to support the load of the vehicle occupant as he or she gets into or out of the vehicle.

A conventional approach to meet this challenge would be to specify either an injection molded trim piece, which requires separate attaching screws and/or clips, or an extruded seal section, which could include a continuous internal metal carrier. In the automotive application of the present invention, both of these conventional alternatives were found to be cost prohibitive in terms of tooling investment.

SUMMARY OF THE INVENTION

Therefore, to conceal and protect a vehicle door or hatch opening flange of riveted construction and to provide a sealing surface for the door seal, the present invention provides a door sill garnish trim piece with an extruded section that features a seating member opposite a pair of curved projects. When the door sill garnish trim is snapped onto the metal door or hatch flange, these curved projections deflect around and provide clearance for a line of rivet heads on the vehicle door or hatch flange allowing the flange to seat snugly. Contiguous with this pair of curved projections is a tubular closed cell structure that provides support for an occupant's hand or body as he or she gets into or out of the vehicle door. A narrow U-shaped channel extending from and looping behind the seating member maintains the pair of curved projections in tension against the flange and provides a rigid sealing surface for a vehicle door seal. To finish the door sill garnish trim, a piece of carpeting is affixed to the outside surface of the tubular closed cell structure and tucked into the U-shaped channel. Prior to installation, the door sill garnish trim piece is trimmed to a predetermined length. At installation, the door sill garnish trim piece is visually located then manually pressed onto the riveted flange, thus eliminating the need for hand or power tools, as well as fasteners.

DETAILED DESCRIPTION OF THE PREFERRED EMBODIMENT

Figure 1:
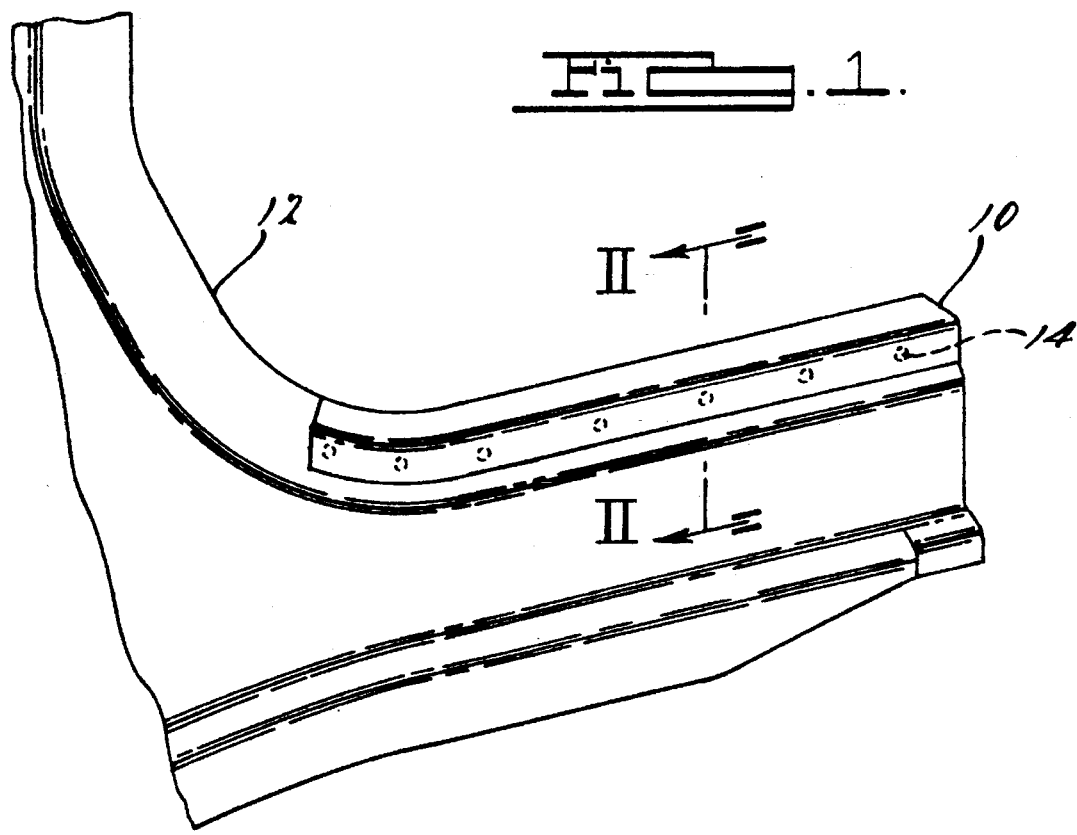
FIG. 1 is a perspective view depicting the interior vehicle door opening flange of riveted construction with a door sill garnish trim of the present invention snapped over the flange.

Referring now to the drawings wherein like reference numerals represent the same components among the several views, FIG. 1 is the interior of an automotive vehicle with a door sill garnish trim 10 of the present invention snapped over a riveted door opening flange 12.

Figure 2:
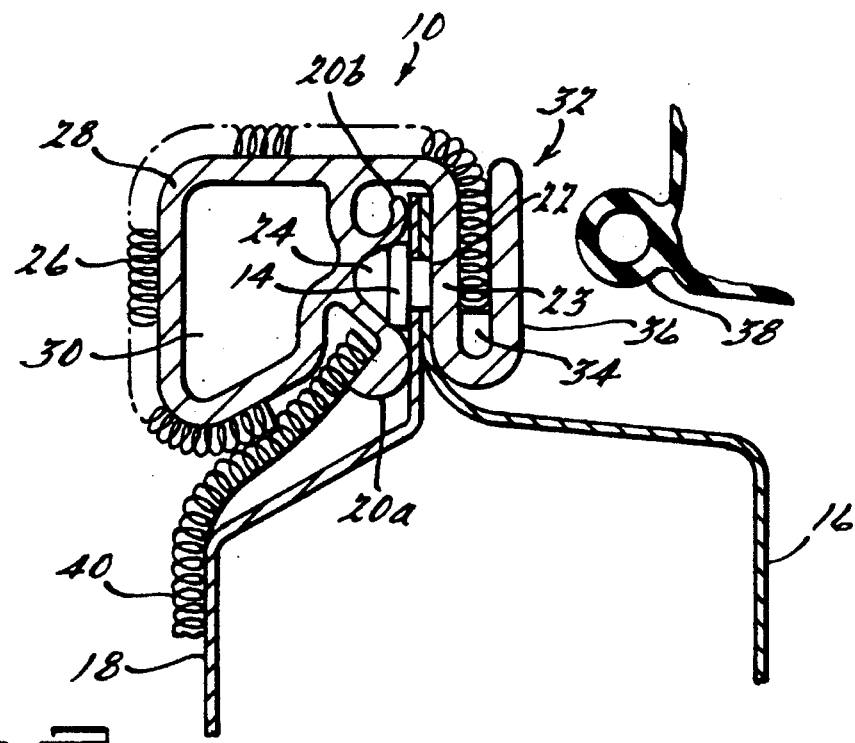
FIG. 2 is a cross-sectional view of the door sill garnish trim of the present invention taken in the direction of Arrows 2—2 of FIG. 1.

Referring now to FIG. 2, the door opening flange 12 in the preferred embodiment is a high and narrow section of aluminum construction having a line of rivet heads 14, which secure the exterior door sill panel 16 to the interior door sill panel 18. In the preferred embodiment, the door sill garnish trim 10 is made of a material conforming or similar to Chrysler Material Standard (MS) AR30, which specifies a material that is semi-rigid but resilient. MS AR30 is attached to this description and incorporated by reference. The door sill garnish trim 10 is formed in an extrusion process that is well known in the art.

The cross-section of the door sill garnish trim 10 features a pair of curved projections 20a and 20b that deflect around the line of rivet heads 14 during installation. The curved projections 20a and 20b return to their original positions once the door sill garnish trim 10 is seated allowing it to snap over the line of rivet heads 14 onto the vehicle door opening flange 12. When the curved projections 20a and 20b are seated over the rivet heads 14, they maintain pressure against the vehicle door opening flange 12 seating it against a flat surface 22 on a seating member 23 forming part of the door sill garnish trim 10. The curved projections 20a and 20b are shaped such that a rivet head clearance 24 is provided. The rivet head clearance 24, in combination with the curved geometry of the projections 20a and 20b and the resilient properties of MS AR30, enable the door sill garnish trim 10 to tolerate minor variations in the location of the rivet heads 14 relative to the top of the vehicle door opening flange 12 allowing flat surface 22 to seat snugly against the vehicle door opening flange 12.

Contiguous with the curved projections 20a and 20b is a substantially box-shaped tube 28, which forms a closed cell structure. When the door sill garnish trim 10 is installed on the vehicle door opening flange 12, the tube 28 faces toward the interior of the vehicle. The closed cell 30 and substantially box-shape design of the tube 28 in combination with the stiffness of MS AR30 combine to create a structure that is strong enough to support an occupant's hand or body as he or she gets into or out of the vehicle.

The seating member 23 extends away and loops in the direction opposite from the tube 28 and the curved projections 20a and 20b to form a "U"-shaped member 32 having a channel 34. This U-shaped member 32 maintains the door sill garnish trim 10 in tension against the vehicle door opening flange 12 and provides a rigid sealing surface 36 facing toward the exterior of the vehicle when the door sill garnish trim 10 is installed. In the preferred embodiment, this sealing surface 36 accepts a door-mounted bulb seal 38. The thickness of this U-shaped member 32 is maintained at the consistent dimension of the tube 28 and the seating member 23 in the preferred embodiment, which is approximately 0.125 inches.

The door sill garnish trim 10 is manually installed on the vehicle door opening flange 12. The extruded section of the door sill garnish trim 10 is cut to an predetermined length that corresponds to the vehicle door opening flange 12. The door sill garnish trim 10 is then covered with a die-cut piece of carpet 26. The carpet piece 26 is affixed to the exterior surface of the tube 28 with its end tucked into the channel 34 of the U-shaped member 32 using any suitable adhesive, many of which are well known in the art. The door sill garnish trim 10 is visually located then pressed manually onto the riveted vehicle door opening flange 12 to cover and conceal the top of the interior vehicle carpeting 40, which is unfinished. This installation process is particularly advantageous because it requires no fasteners or locating fixtures and it eliminates the need for power or hand tools to effect installation thereby precluding damage to either the trim installer or the vehicle. In addition, the absence of fastening holes in the door sill garnish trim 10 helps to minimize the intrusion of water and road noise into the passenger compartment of the vehicle.

For applications in which the sweep angle of the vehicle door opening flange 12 is more aggressive or in which the length of the door sill garnish trim 10 is increased, cuts in the top area of the seating member 23 may be provided to relieve stress in the door sill garnish trim 10 as it conforms to the door opening flange 12. Alternatively, a sweep can be induced in the door sill garnish trim 10 prior to its installation by fixing it on an appropriately shaped plate before application of the carpet 26.

This new and innovative means of designing and applying garnish trim to a riveted flange can be used in any motor vehicle application from passenger car through class 8 trucks and off-road vehicles. Alternative constructions, of course, will be apparent to those skilled in the art who should realize that obvious variations made to the disclosed embodiment still properly fall within the scope of the present invention, as defined by the claims that follow.

I claim:

1. An apparatus for protecting a flange on a vehicle body, said flange retaining a fastener with a head, comprising:

a base section having a seating portion with a first surface for accepting said body flange and a first projection connected to and opposite said first surface, said first projection being curved to deflect over said fastener head during the seating of said body flange.

2. The apparatus of claim 1, further comprising:

a second projection connected to said first projection and curved to provide clearance for and tension against said fastener head once said body flange is seated.

3. The apparatus of claim 1, further comprising:

an extension connected to, and extending away from, said seating portion, said extension forming a channel with said seating portion.

4. The apparatus of claim 3 wherein said extension has a sealing surface suitable for contacting a seal to provide tight closure between said sealing surface and said seal.

5. The apparatus of claim 3, wherein said base portion is cut to allow it to conform to a compound sweep angle of said body flange.

6. The apparatus of claim 1, wherein said first projection is operative to return to its substantially original position when said body flange is seated.

7. The apparatus of claim 1, further comprising:

a tube connected to said seating portion.

8. The apparatus of claim 7, wherein said base portion is made of a semi-rigid plastic material.

9. The apparatus of claim 1, further comprising:

a fabric member received within said channel and affixed to said tube.

10. The apparatus of claim 9 wherein said fabric member is carpeting.

11. The apparatus of claim 9, wherein said fabric member is affixed with an adhesive to said tube and within said channel.

12. A trim piece for covering a flange that receives a fastener with a head, comprising:

a base portion with a seating member that has a seating surface for accepting said flange, said base portion having;

a first projection opposite but connected to said seating surface and curved to deflect over said fastener head during the seating of said flange and to return to its substantially original position once said flange is seated;

a second projection connected to said first projection and curved to provide clearance for and tension against said fastener head once said flange is seated;

an extension connected to said seating member to form a channel with said seating member and providing a sealing surface opposite said seating surface suitable for contacting a seal to provide tight closure between said sealing surface and said seal; and a tube connected to said seating portion and said first projection.

13. The trim piece of claim 12, further comprising:

a first carpet piece affixed to said base portion and received within said channel.

14. The trim piece of claim 12, wherein said base portion is made of a semi-rigid plastic material.

15. A method for trimming a vehicle body panel constructed with fasteners having heads, comprising the steps of:

providing a trim piece having a base member with a first surface for accepting said body panel and a curved projection opposite said first surface, said curved projection being able to deflect over said fastener heads, and an extension connected to said first surface to form a channel for accepting fabric;

sizing said base member to a length that matches said body panel;

securing said fabric to said base member within said channel; and pushing said trim piece onto said body panel.

16. The method of claim 15, further comprising the step of:

locating visually said trim piece relative to said body panel.

17. The method of claim 16, wherein said pushing step is performed manually.

18. The method of claim 15, further comprising the step of:

relieving said base member to enable said trim piece to accommodate a compound angle of said body panel.

* * * * *